United States Patent
Yu et al.

(10) Patent No.: US 9,846,233 B2
(45) Date of Patent: Dec. 19, 2017

(54) HOME ROBOT AND CONTROL METHOD THEREOF

(71) Applicant: JIANGSU MIDEA CLEANING APPLIANCES CO., LTD., Suzhou (CN)

(72) Inventors: Qinghao Yu, Suzhou (CN); Yuan Chen, Suzhou (CN); Qiang Shen, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 0 days.

(21) Appl. No.: 15/118,766

(22) PCT Filed: Aug. 11, 2015

(86) PCT No.: PCT/CN2015/086689
§ 371 (c)(1),
(2) Date: Aug. 12, 2016

(87) PCT Pub. No.: WO2016/110096
PCT Pub. Date: Jul. 14, 2016

(65) Prior Publication Data
US 2017/0052255 A1    Feb. 23, 2017

(30) Foreign Application Priority Data

Jan. 6, 2015   (CN) .......................... 2015 1 0005709

(51) Int. Cl.
*G01S 15/93*    (2006.01)
*A47L 11/00*    (2006.01)
(Continued)

(52) U.S. Cl.
CPC ............ *G01S 15/93* (2013.01); *A47L 9/2826* (2013.01); *A47L 11/00* (2013.01); *G05D 1/0255* (2013.01);
(Continued)

(58) Field of Classification Search
CPC ... G01S 15/93; G05D 1/0255; A47L 2201/04; A47L 2201/00; A47L 2201/06
See application file for complete search history.

(56) References Cited

U.S. PATENT DOCUMENTS 5,315,517 A * 5/1994 Kawase ............... G05D 1/0248
180/167
2006/0074528 A1  4/2006 Uehigashi
(Continued)

FOREIGN PATENT DOCUMENTS

CN    102385056    3/2012
CN    102490172    6/2012

OTHER PUBLICATIONS

International Searching Authority, International Search Report for PCT/CN2015/086689 dated Oct. 3, 2015.

*Primary Examiner* — Curtis Odom
(74) *Attorney, Agent, or Firm* — Hodgson Russ LLP

(57) ABSTRACT

A home robot and control method thereof; the home robot comprises: a casing (100); a plurality of ultrasonic transmitters (200) and a plurality of ultrasonic receivers (300) provided on the casing (100) arranged at intervals; and a controller (400) connected to the plurality of ultrasonic transmitters (200) and the plurality of ultrasonic receivers (300) respectively, the controller (400) being used to control the plurality of ultrasonic transmitters (200) to transmit first ultrasonic wave signals according to a preset period and to detect a front obstacle according to signals received by the plurality of ultrasonic receivers (300). The home robot can detect the direction of an obstacle, and is not affected by a (Continued)

material of the obstacle, thus enabling the home robot to perform an avoidance method according to the detected direction of the obstacle, avoiding a collision between the home robot and the obstacle, increasing a cleaning coverage rate and improving a user experience.

12 Claims, 2 Drawing Sheets

(51) Int. Cl.
*A47L 9/28* (2006.01)
*G05D 1/02* (2006.01)

(52) U.S. Cl.
CPC .. *A47L 2201/04* (2013.01); *G05D 2201/0203* (2013.01)

(56) References Cited

U.S. PATENT DOCUMENTS

| | | | |
|---|---|---|---|
| 2006/0100741 A1 | 5/2006 | Jung | |
| 2006/0132611 A1* | 6/2006 | Sano | G05D 1/0225 348/207.99 |
| 2012/0232696 A1 | 9/2012 | Tang | |

* cited by examiner

HOME ROBOT AND CONTROL METHOD THEREOF

FIELD

The present disclosure relates to a field of electrical appliance, and more particularly relates to a home robot and a control method thereof.

BACKGROUND

With the high-speed development of intelligent robot technology, an increasing number of intelligent cleaners have come into users' homes, which improves comfort and convenience of people's lives. Users concentrate on intelligence of products when they select and purchase intelligent cleaners. More customers may be attracted if the products use leading intelligent technology.

At present, when the intelligent cleaners in related arts detect obstacles, infrared sensors have been mainly used to judge the distance. Because some colored materials may lead to infrared sensors failure, there may be a collision so that the users' experience is poor.

SUMMARY

Embodiments of the present disclosure seek to solve at least one of the problems existing in the related art to at least some extent. Accordingly, a first objective of the present disclosure is to provide a home robot, which can detect the orientation of an obstacle and ignore material influence of the obstacle. Therefore, the home robot can use corresponding avoiding method according to the detected orientation of the obstacle so as to avoid a collision between the home robot and the obstacle and also to improve the coverage rate of cleaning, thereby improving users' experience.

A second objective of the present disclosure is to provide a control method of a home robot.

In order to achieve the above objectives, embodiments of a first aspect of the present disclosure provide a home robot, which includes: a shell; a plurality of ultrasonic transmitters and a plurality of ultrasonic receivers disposed on the shell, in which the plurality of ultrasonic transmitters and the plurality of ultrasonic receivers are arranged alternately with each other; a controller connected with the plurality of ultrasonic transmitters and the plurality of ultrasonic receivers, respectively, and configured to control the plurality of ultrasonic transmitters to send first ultrasonic signals at intervals according to a preset cycle and to detect a front obstacle according to signals received by the plurality of ultrasonic receivers.

The home robot according to embodiments of the present disclosure, includes a shell, a plurality of ultrasonic transmitters and a plurality of ultrasonic receivers and a controller, in which the controller controls the plurality of ultrasonic transmitters to send the first ultrasonic signals at intervals according to a preset cycle and detects the front obstacle according to the signals received by the plurality of ultrasonic receivers. The home robot can detect the orientation of the obstacle and ignore material influence of the obstacle, such that the home robot may use corresponding avoiding methods according to the detected orientation of the obstacle to avoid a collision between the home robot and the obstacle and also to provide coverage rate of cleaning, thereby improving users' experience.

In an embodiment of the present disclosure, the plurality of ultrasonic transmitters and the plurality of ultrasonic receivers include: a first ultrasonic receiver located on a frontage of the home robot; a first ultrasonic transmitter and a second ultrasonic transmitter located at two sides of the first ultrasonic receiver, respectively, in which there is a first angle between the first ultrasonic transmitter and the first ultrasonic receiver, and there is the first angle between the second ultrasonic transmitter and the first ultrasonic receiver; a second ultrasonic receiver and a third ultrasonic receiver located at an out side of the first ultrasonic transmitter and an out side of the second ultrasonic transmitter respectively, in which there is a second angle between the second ultrasonic receiver and the first ultrasonic transmitter and there is the second angle between the third ultrasonic receiver and the second ultrasonic transmitter.

In an embodiment of the present disclosure, the first angle is equal to the second angle.

In an embodiment of the present disclosure, the controller is configured to control the first ultrasonic transmitter to send the first ultrasonic signal, and to control the second ultrasonic transmitter to send the first ultrasonic signal after a preset delay time.

In an embodiment of the present disclosure, a signal received by the first ultrasonic receiver is configured as a first signal, a signal received by the second ultrasonic receiver is configured as a second signal, and a signal received by the third ultrasonic receiver is configured as a third signal. If the third signal is greater than the first signal and the first signal is greater than the second signal, it is determined that the front obstacle is on a right side of the home robot; if the third signal and the second signal are both less than the first signal, it is determined that the front obstacle is right in front of the home robot; and if the second signal is greater than the first signal and the first signal is greater than the third signal, it is determined that the front obstacle is on a left side of the home robot.

In an embodiment of the present disclosure, the controller is further configured to control the first ultrasonic transmitter and the second ultrasonic transmitter according to the signals received by the plurality of ultrasonic receivers.

In an embodiment of the present disclosure, if it is determined that the front obstacle is on the left side of the home robot, the controller is configured to control the second ultrasonic transmitter to send a second ultrasonic signal, and a signal strength of the second ultrasonic signal is less than that of the first ultrasonic signal; if it is determined that the front obstacle is on the right side of the home robot, the controller is configured to control the first ultrasonic transmitter to send the second ultrasonic signal.

In one embodiment of the present disclosure, if the front obstacle detected changes, the first ultrasonic transmitter or the second ultrasonic transmitter is adjusted to send the first ultrasonic signal.

In order to achieve the above objectives, embodiments of a second aspect of the present disclosure provide a control method of a home robot. The home robot includes a plurality of ultrasonic transmitters and a plurality of ultrasonic receivers arranged alternately with each other. The control method includes: controlling the plurality of ultrasonic transmitters to send first ultrasonic signals at intervals according to a preset cycle; detecting a front obstacle according to signals received by the plurality of ultrasonic receivers.

With the control method according to embodiments of the present disclosure, by controlling the plurality of ultrasonic transmitters to send first ultrasonic signals at intervals according to a preset cycle and detecting the front obstacle according to the signals received by the plurality of ultrasonic receivers, the control method may detect the orientation of the obstacle and ignore material influence of the obstacle, such that the home robot may use corresponding avoiding methods according to the detected orientation of the obstacle to avoid a collision between the home robot and the obstacle and also to improve coverage rate of cleaning, thereby improving users' experience.

In an embodiment of the present disclosure, the plurality of ultrasonic transmitters and the plurality of ultrasonic receivers include: a first ultrasonic receiver located on a frontage of the home robot; a first ultrasonic transmitter and a second ultrasonic transmitter located at two sides of the first ultrasonic receiver respectively, in which there is a first angle between the first ultrasonic transmitter and the first ultrasonic receiver, and there is the first angle between the second ultrasonic transmitter and the first ultrasonic receiver; a second ultrasonic receiver and a third ultrasonic receiver located at an out side of the first ultrasonic transmitter and an out side of the second ultrasonic transmitter respectively, in which there is a second angle between the second ultrasonic receiver and the first ultrasonic transmitter and there is the second angle between the third ultrasonic receiver and the second ultrasonic transmitter.

In an embodiment of the present disclosure, the first angle is equal to the second angle.

In an embodiment of the present disclosure, controlling the plurality of ultrasonic transmitters to send first ultrasonic signals at intervals according to a preset cycle includes: controlling the first ultrasonic transmitter to send the first ultrasonic signal, and controlling the second ultrasonic transmitter to send the first ultrasonic signal after a preset delay time.

In an embodiment of the present disclosure, a signal received by the first ultrasonic receiver is configured as a first signal, a signal received by the second ultrasonic is configured as a second signal, and a signal received by the third ultrasonic is configured as a third signal. Detecting a front obstacle according to signals received by the plurality of ultrasonic receivers specifically includes: if the third signal is greater than the first signal and the first signal is greater than the second signal, determining that the front obstacle is on a right side of the home robot; if the third signal and the second signal are both less than the first signal, determining that the front obstacle is right in front of the home robot; and if the second signal is greater than the first signal and the first signal is greater than the third signal, determining that the front obstacle is on a left side of the home robot.

In an embodiment of the present disclosure, the control method further includes: controlling the first ultrasonic transmitter and the second ultrasonic transmitter according to the signals received by the plurality of ultrasonic receivers.

In an embodiment of the present disclosure, controlling the first ultrasonic transmitter and the second ultrasonic transmitter according to the signals received by the plurality of ultrasonic receivers specifically includes: if it is determined that the front obstacle is on the left side of the home robot, controlling the second ultrasonic transmitter to send a second ultrasonic signal, and a signal strength of the second ultrasonic signal is less than that of the first ultrasonic signal; if it is determined that the front obstacle is on the right side of the home robot, controlling the first ultrasonic transmitter to send the second ultrasonic signal.

In an embodiment of the present disclosure, the control method further includes: if the front obstacle detected changes, adjusting the first ultrasonic transmitter or the second ultrasonic transmitter to send the first ultrasonic signal.

Figure 1:
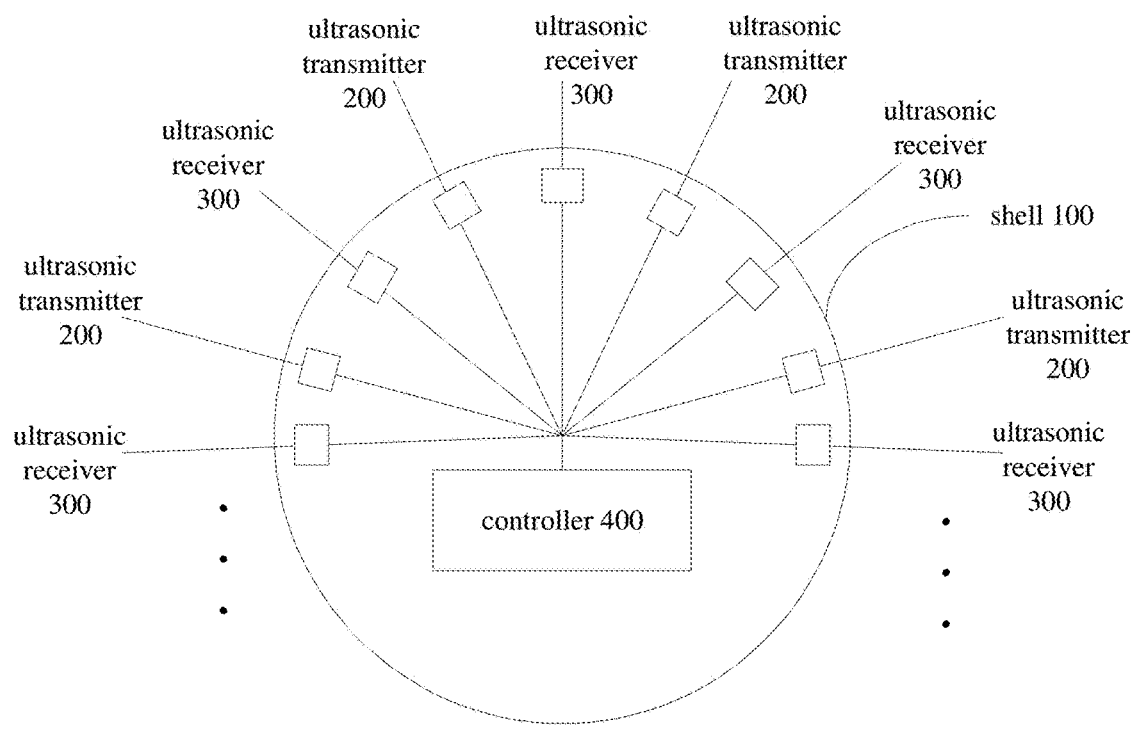
FIG. 1 is a block diagram of a home robot according to an embodiment of the present disclosure.

Reference numerals: a shell 100, a plurality of ultrasonic transmitters 200, a plurality of ultrasonic receivers 300, a controller 400, a first ultrasonic receiver 300A, a first ultrasonic transmitter 200B, a second ultrasonic transmitter 200C, a second ultrasonic receiver 300D and a third ultrasonic receiver 300E.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

The present disclosure provides a home robot and a control method thereof. The home robot and the control method thereof according to embodiments of the present disclosure will be described with reference to drawings.

FIG. 1 is a block diagram of a home robot according to an embodiment of the present disclosure. As shown in FIG. 1, the home robot includes: a shell 100, a plurality of ultrasonic transmitters 200, a plurality of ultrasonic receivers 300 and a controller 400.

The plurality of ultrasonic transmitters 200 and the plurality of ultrasonic receivers 300 are disposed on the shell 100 and arranged alternately with each other. The controller 400 is connected with the plurality of ultrasonic transmitters and the plurality of ultrasonic receivers, respectively. And the controller 400 is configured to control the plurality of ultrasonic transmitters 200 to send first ultrasonic signals at intervals according to a preset cycle and to detect a front obstacle according to signals received by the plurality of ultrasonic receivers 300.

In an embodiment of the present disclosure, the plurality of ultrasonic transmitters 200 and the plurality of ultrasonic receivers 300 include: a first ultrasonic receiver 300A, a first ultrasonic transmitter 200B, a second ultrasonic transmitter 200C, a second ultrasonic receiver 300D and a third ultrasonic receiver 300E.

Figure 2:
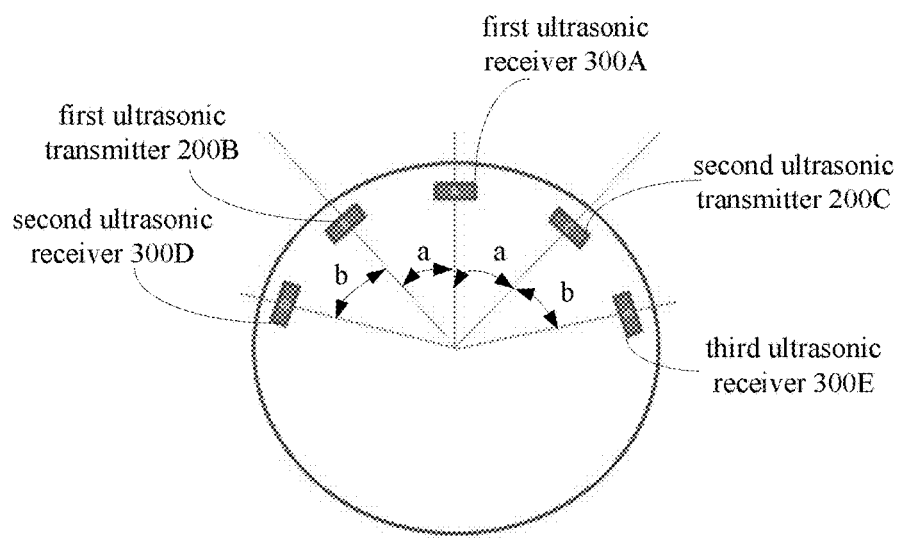
FIG. 2 is a block diagram of a home robot according to another embodiment of the present disclosure.

As shown in FIG. 2, the first ultrasonic receiver 300A is located on a frontage of the home robot. The first ultrasonic transmitter 200B and a second ultrasonic transmitter 200C are located at two sides of the first ultrasonic receiver 300A respectively, and there is a first angle a between the first ultrasonic receiver 300A and each of the first ultrasonic transmitter 200B and the second ultrasonic transmitter 200C. The second ultrasonic receiver 300D and the third ultrasonic receiver 300E are located at an out side of the first ultrasonic transmitter 200B and an out side of the second ultrasonic transmitter 200C respectively, and there is a second angle b between the second ultrasonic receiver 300D and the first ultrasonic transmitter 200B, and there is the second angle b between the third ultrasonic receiver 300E and the second ultrasonic transmitter 200C.

In an embodiment of the present disclosure, the first angle a is equal to the second angle b, which means that the first ultrasonic receiver 300A, the first ultrasonic transmitter 200B, the second ultrasonic transmitter 200C, the second ultrasonic receiver 300D and the third ultrasonic receiver 300E are distributed at the same angle intervals.

In an embodiment of the present disclosure, the controller 400 controls the first ultrasonic transmitter 200B to send the first ultrasonic signal, and controls the second ultrasonic transmitter 200C to send the first ultrasonic signal after a preset delay time.

Specifically, for example, the controller 400 controls the first ultrasonic transmitter 200B and the second ultrasonic transmitter 200C to send the first ultrasonic signals according to the preset cycle (e.g. 40 ms). Moreover, the first ultrasonic transmitter 200B and the second ultrasonic transmitter 200C send signals alternately, i.e., the second ultrasonic transmitter 200C sends the first ultrasonic signal the preset delay time (e.g. 20 ms) later than the first ultrasonic transmitter 200B.

In an embodiment of the present disclosure, a signal received by the first ultrasonic receiver 300A is configured as a first signal (denoted as RxCR), a signal received by the second ultrasonic receiver 300D is configured as a second signal (denoted as RxL), and a signal received by the third ultrasonic receiver 300E is configured as a third signal (denoted as RxR). If the third signal RxR is greater than the first signal RxCR and the first signal RxCR is greater than the second signal RxL, it is determined that the front obstacle is on the right side of the home robot. If the third signal RxR and the second signal RxL are both less than the first signal RxCR, it is determined that the front obstacle is right in front of the home robot. And if the second signal RxL is greater than the first signal RxCR and the first signal RxCR is greater than the third signal RxR, it is determined that the front obstacle is on the left side of the home robot.

Specifically, if RxR>RxCR>RxL, and RxR, RxCR and RxL are all greater than Vth (Vth is a value of the signal detected by an ultrasonic receiver under a situation that there is no obstacle), it is determined that the obstacle is in the right-side region of the home robot. If RxCR>RxR and RxCR>RxL, and RxR, RxCR and RxL are all greater than Vth, it is determined that the obstacle is in the front region of the home robot. If RxL>RxCR>RxR, and RxR, RxCR and RxL are all greater than Vth, it is determined that the obstacle is in the left-side region of the home robot.

In an embodiment of the present disclosure, the controller 400 is further configured to control the first ultrasonic transmitter 200B and the second ultrasonic transmitter 200C according to the signals received by the plurality of ultrasonic receivers 300.

Further, in an embodiment of the present disclosure, if the front obstacle is judged on the left side of the home robot, the controller 400 controls the second ultrasonic transmitter 200C to send a second ultrasonic signal, and a signal strength of the second ultrasonic signal is less than that of the first ultrasonic signal; if the front obstacle is judged on the right side of the home robot, the controller 400 controls the first ultrasonic transmitter 200B to send the second ultrasonic signal.

Figure 3:
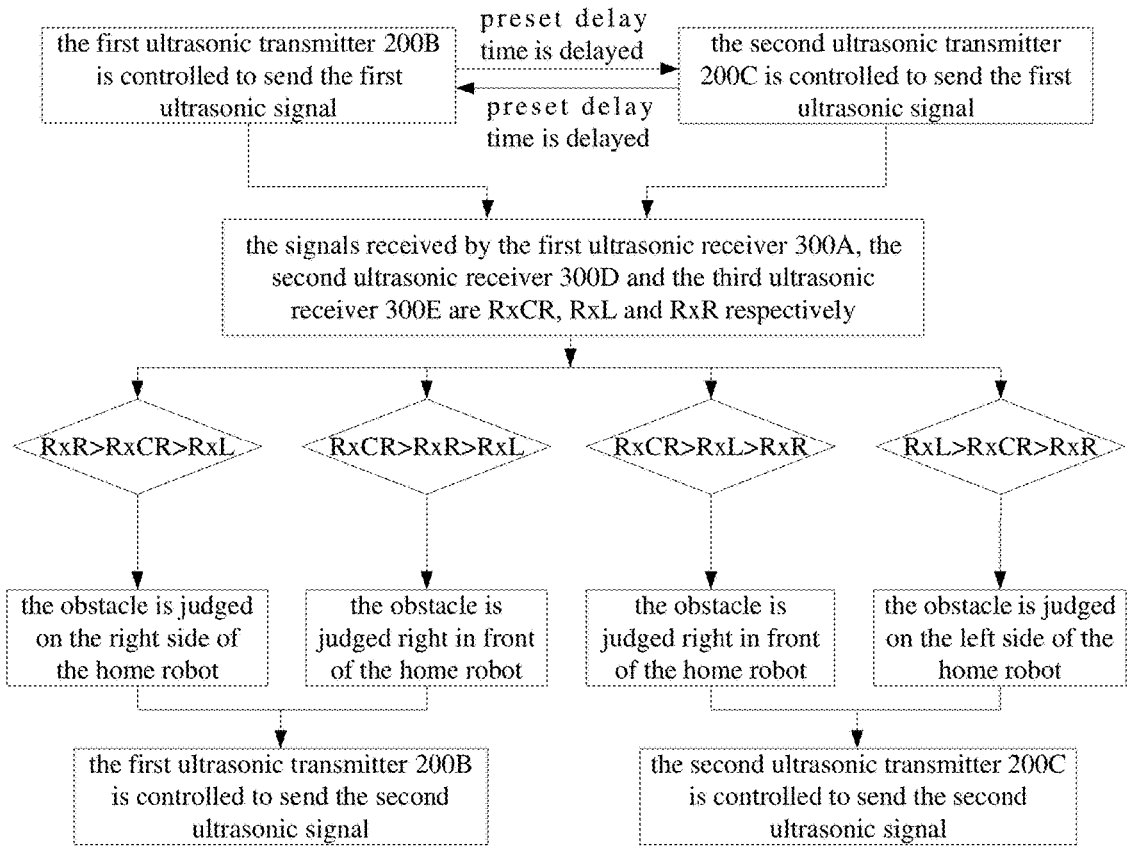
FIG. 3 is a schematic diagram of an ultrasonic transmitter sending an ultrasonic signal and an ultrasonic receiver receiving an ultrasonic signal according to an embodiment of the present disclosure.

Specifically, as shown in FIG. 3, if the obstacle is judged on the left side of the home robot, the controller 400 controls the second ultrasonic transmitter 200C on the right side of the shell 100 to send the second ultrasonic signal, i.e. the strength of ultrasonic signal sent by the second ultrasonic transmitter 200C is reduced, so as to avoid interference of the second ultrasonic transmitter 200C when the first ultrasonic receiver 300A, the second ultrasonic receiver 300D and the third ultrasonic receiver 300E receive the signals sent by the first ultrasonic transmitter 200B. Similarly, if the obstacle is judged on the right side of the home robot, the controller 400 controls the first ultrasonic transmitter 200B to send the second ultrasonic signal, i.e. the strength of ultrasonic signal sent by the first ultrasonic transmitter 200B is reduced.

In addition, in an embodiment of the present disclosure, as shown in FIG. 3, if the obstacle is judged in front of the home robot, and if RxR>RxL (i.e. the obstacle is in front of the home robot but slightly tilted to the right), the controller 400 controls the first ultrasonic transmitter 200B to send the second ultrasonic signal; if RxL>RxR (i.e. the obstacle is in front of the home robot but slightly tilted to the left), the controller 400 controls the second ultrasonic transmitter 200C to send the second ultrasonic signal.

In an embodiment of the present disclosure, if the front obstacle detected changes, the first ultrasonic transmitter 200B or the second ultrasonic transmitter 200C is adjusted to send the first ultrasonic signal.

Specifically, for example, in the above embodiments, if the obstacle is on the left side of the home robot, the controller 400 controls the second ultrasonic transmitter 200C to send the second ultrasonic signal. If the obstacle detected changes (e.g. the location of the obstacle is changed to the right side of the home robot), the controller 400 is adjusted to control the second ultrasonic transmitter 200C to send the first ultrasonic signal.

The home robot in an embodiment of the present disclosure, includes: a shell; a plurality of ultrasonic transmitters, a plurality of ultrasonic receivers and a controller, in which the controller controls the plurality of ultrasonic transmitters to send the first ultrasonic signals at intervals according to a preset cycle and detects the front obstacle according to the signals received by the plurality of ultrasonic receivers. The home robot can detect the orientation of the obstacle and ignore material influence of the obstacle. Therefore, the home robot can use corresponding avoiding methods according to the detected orientation of the obstacle so as to avoid a collision between the home robot and the obstacle and also to improve coverage rate of cleaning, thereby improving users' experience.

In order to achieve the above embodiments, the present disclosure further provides a control method of a home robot.

Figure 4:
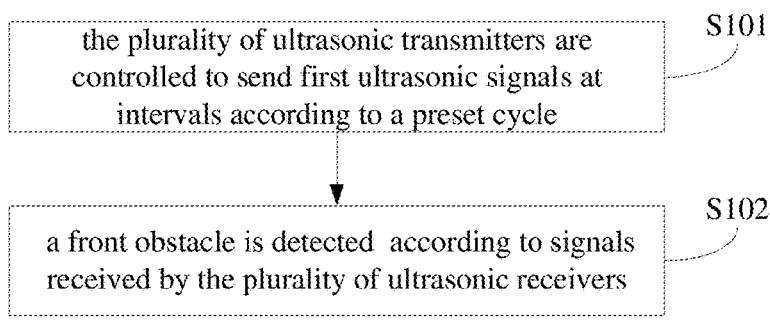
FIG. 4 is a flow chart showing a control method of a home robot according to an embodiment of the present disclosure.

FIG. 4 is a flow chart of a control method of a home robot according to an embodiment of the present disclosure, in which the home robot includes a plurality of ultrasonic transmitters and a plurality of ultrasonic receivers arranged alternately with each other. As shown in FIG. 4, the control method of the home robot according to the embodiment of the present disclosure includes followings:

In step S101, the plurality of ultrasonic transmitters are controlled to send first ultrasonic signals at intervals according to a preset cycle.

In an embodiment of the present disclosure, the plurality of ultrasonic transmitters and the plurality of ultrasonic receivers include: a first ultrasonic receiver, a first ultrasonic transmitter, a second ultrasonic transmitter, a second ultrasonic receiver and a third ultrasonic receiver.

As shown in FIG. 2, the first ultrasonic receiver is located on a frontage of the home robot. The first ultrasonic transmitter and the second ultrasonic transmitter are located at two sides of the first ultrasonic receiver, respectively. And there is a first angle a between the first ultrasonic receiver and each of the first ultrasonic transmitter and the second ultrasonic transmitter. The second ultrasonic receiver and the third ultrasonic receiver are located at an out side of the first ultrasonic transmitter and an out side of the second ultrasonic transmitter respectively, and there is a second angle b between the second ultrasonic receiver and the first ultrasonic transmitter, and between the third ultrasonic receiver and the second ultrasonic transmitter.

In an embodiment of the present disclosure, the first angle a is equal to the second angle b, which means that the first ultrasonic receiver, the first ultrasonic transmitter, the second ultrasonic transmitter, the second ultrasonic receiver and the third ultrasonic receiver are distributed at the same angle intervals.

In an embodiment of the present disclosure, step S101 specifically includes: controlling the first ultrasonic transmitter to send the first ultrasonic signal, and controlling the second ultrasonic transmitter to send the first ultrasonic signal after a preset delay time.

Specifically, for example, the first ultrasonic transmitter and the second ultrasonic transmitter are controlled to send the first ultrasonic signals according to the preset cycle (e.g. 40 ms).

Moreover, the first ultrasonic transmitter and the second ultrasonic transmitter send signals alternately, which means that the second ultrasonic transmitter sends the first ultrasonic signal the preset delay time (e.g. 20 ms) later than the first ultrasonic transmitter.

In step S102, a front obstacle is detected according to signals received by the plurality of ultrasonic receivers.

In an embodiment of the present disclosure, a signal received by the first ultrasonic receiver is configured as a first signal (denoted as RxCR), a signal received by the second ultrasonic receiver is configured as a second signal (denoted as RxL), and a signal received by the third ultrasonic receiver is configured as a third signal (denoted as RxR). Step S102 specifically includes: if the third signal is greater than the first signal and the first signal is greater than the second signal, determining that the front obstacle is on the right side of the home robot; if the third signal and the second signal are both less than the first signal, determining that the front obstacle is right in front of the home robot; and if the second signal is greater than the first signal and the first signal is greater than the third signal, determining that the front obstacle is on the left side of the home robot.

Specifically, if RxR>RxCR>RxL, and RxR, RxCR and RxL are all greater than Vth (Vth is a value of the signal detected by an ultrasonic receiver under a situation that there is no obstacle), it is determined that the obstacle is in the right-side region of the home robot; if RxCR>RxR and RxCR>RxL, and RxR, RxCR and RxL are all greater than Vth, it is determined that the obstacle is in a front region of the home robot; if RxL>RxCR>RxR, and RxR, RxCR and RxL are all greater than Vth, it is determined that the obstacle is in the left-side region of the home robot.

In an embodiment of the present disclosure, the control method of the home robot further includes: controlling the first ultrasonic transmitter and the second ultrasonic transmitter according to the signals received by the plurality of ultrasonic receivers.

In an embodiment of the present disclosure, controlling the first ultrasonic transmitter and the second ultrasonic transmitter according to the signals received by the plurality of ultrasonic receivers specifically includes: if the front obstacle is judged on the left side of the home robot, controlling the second ultrasonic transmitter to send the second ultrasonic signal, in which a signal strength of the second ultrasonic signal is less than that of the first ultrasonic signal; if the front obstacle is judged on the right side of the home robot, controlling the first ultrasonic transmitter to send the second ultrasonic signal.

Specifically, as shown in FIG. 3, if the obstacle is judged on the left side of the home robot, the second ultrasonic transmitter is controlled to send the second ultrasonic signal, which means that the strength of ultrasonic signal sent by the second ultrasonic transmitter is reduced, so as to avoid interference of the second ultrasonic transmitter when the first ultrasonic receiver, the second ultrasonic receiver and the third ultrasonic receiver receive the signals sent by the first ultrasonic transmitter. Similarly, if the obstacle is judged on the right side of the home robot, the first ultrasonic transmitter is controlled to send the second ultrasonic signal, which means that the strength of ultrasonic signal sent by the first ultrasonic transmitter is reduced.

In addition, in an embodiment of the present disclosure, as shown in FIG. 3, if the obstacle is judged in front of the home robot, and if RxR>RxL (i.e. the obstacle is located in front of the home robot but slightly tilted to the right), the first ultrasonic transmitter is controlled to send the second ultrasonic signal; if RxL>RxR (i.e. the obstacle is located in front of the home robot but slightly tilted to the left), the second ultrasonic transmitter is controlled to send the second ultrasonic signal.

In an embodiment of the present disclosure, the control method further includes: if the front obstacle detected changes, adjusting the first ultrasonic transmitter or the second ultrasonic transmitter to send the first ultrasonic signal.

Specifically, for example, in the above embodiments, if the obstacle is on the left side of the home robot, the second ultrasonic transmitter is controlled to send the second ultrasonic signal. If the detected obstacle changes (e.g. the location of the obstacle is changed to the right side of the home robot), the second ultrasonic transmitter is adjusted to send the first ultrasonic signal.

The control method of the home robot in an embodiment of the present disclosure controls the plurality of ultrasonic transmitters to send the first ultrasonic signals at intervals according to a preset cycle and detects the front obstacle according to the signals received by the plurality of ultrasonic receivers. The method can detect the orientation of the obstacle and ignore material influence of the obstacle. Therefore, the home robot can use corresponding avoiding methods according to the detected orientation of the obstacle so as to avoid a collision between the home robot and the obstacle and also to improve coverage rate of cleaning and, thereby improving users' experience.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise", "axial", "radial" and "circumferential" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A home robot, comprising:
   a shell;
   a plurality of ultrasonic transmitters and a plurality of ultrasonic receivers, disposed on the shell, wherein the plurality of ultrasonic transmitters and the plurality of ultrasonic receivers are arranged alternately with each other; and
   a controller, connected with the plurality of ultrasonic transmitters and the plurality of ultrasonic receivers, respectively, and configured to control the plurality of ultrasonic transmitters to send first ultrasonic signals at intervals according to a preset cycle, and to detect a front obstacle according to signals received by the plurality of ultrasonic receivers;
   wherein the plurality of ultrasonic transmitters and the plurality of ultrasonic receivers comprise:
      a first ultrasonic receiver, located on a frontage of the home robot;
      a first ultrasonic transmitter and a second ultrasonic transmitter, located at two sides of the first ultrasonic receiver, respectively; wherein there is a first angle between the first ultrasonic transmitter and the first ultrasonic receiver, and there is the first angle between the second ultrasonic transmitter and the first ultrasonic receiver; and
      a second ultrasonic receiver and a third ultrasonic receiver, located at an out side of the first ultrasonic transmitter and an out side of the second ultrasonic transmitter, respectively; wherein there is a second angle between the second ultrasonic receiver and the first ultrasonic transmitter, and there is the second angle between the third ultrasonic receiver and the second ultrasonic transmitter;
   wherein a signal received by the first ultrasonic receiver is configured as a first signal, a signal received by the second ultrasonic receiver is configured as a second signal, and a signal received by the third ultrasonic receiver is configured as a third signal, wherein:
      if the third signal is greater than the first signal and the first signal is greater than the second signal, it is determined that the front obstacle is on a right side of the home robot;
      if the third signal and the second signal are both less than the first signal, it is determined that the front obstacle is in front of the home robot; and
      if the second signal is greater than the first signal and the first signal is greater than the third signal, it is determined that the front obstacle is on a left side of the home robot.

2. The home robot according to claim 1, wherein the first angle is equal to the second angle.

3. The home robot according to claim 1, wherein the controller is configured to control the first ultrasonic transmitter to send the first ultrasonic signal, and to control the second ultrasonic transmitter to send the first ultrasonic signal after a preset delay time.

4. The home robot according to claim 1, wherein the controller is further configured to control the first ultrasonic transmitter and the second ultrasonic transmitter according to the signals received by the plurality of ultrasonic receivers.

5. The home robot according to claim 4, wherein:
   if it is determined that the front obstacle is on the left side of the home robot, the controller is configured to control the second ultrasonic transmitter to send the second ultrasonic signal, wherein a signal strength of the second ultrasonic signal is less than that of the first ultrasonic signal; and
   if it is determined that the front obstacle is on the right side of the home robot, the controller is configured to control the first ultrasonic transmitter to send the second ultrasonic signal.

6. The home robot according to claim 5, wherein the first ultrasonic transmitter or the second ultrasonic transmitter is adjusted to send the first ultrasonic signal if the front obstacle detected changes.

7. A control method of a home robot, wherein the home robot comprises a plurality of ultrasonic transmitters and a plurality of ultrasonic receivers arranged alternately with each other, and the control method comprises:

controlling the plurality of ultrasonic transmitters to send first ultrasonic signals at intervals according to a preset cycle;

detecting a front obstacle according to signals received by the plurality of ultrasonic receivers;

wherein the plurality of ultrasonic transmitters and the plurality of ultrasonic receivers comprise:

a first ultrasonic receiver, located on a frontage of the home robot;

a first ultrasonic transmitter and a second ultrasonic transmitter, located at two sides of the first ultrasonic receiver, respectively; wherein there is a first angle between the first ultrasonic transmitter and the first ultrasonic receiver, and there is the first angle between the second ultrasonic transmitter and the first ultrasonic receiver; and a second ultrasonic receiver and a third ultrasonic receiver, located at an out side of the first ultrasonic transmitter and an out side of the second ultrasonic transmitter, respectively; wherein there is a second angle between the second ultrasonic receiver and the first ultrasonic transmitter, and there is the second angle between the third ultrasonic receiver and the second ultrasonic transmitter;

wherein a signal received by the first ultrasonic receiver is configured as a first signal, a signal received by the second ultrasonic receiver is configured as a second signal, and a signal received by the third ultrasonic receiver is configured as a third signal; detecting a front obstacle according to signals received by the plurality of ultrasonic receivers specifically comprises:

if the third signal is greater than the first signal and the first signal is greater than the second signal, determining that the front obstacle is on a right side of the home robot;

if the third signal and the second signal are both less than the first signal, determining that the front obstacle is in front of the home robot; and if the second signal is greater than the first signal and the first signal is greater than the third signal, determining that the front obstacle is on a left side of the home robot.

8. The control method according to claim 7, wherein the first angle is equal to the second angle.

9. The control method according to claim 7, wherein controlling the plurality of ultrasonic transmitters to send first ultrasonic signals at intervals according to a preset cycle, comprises:

controlling the first ultrasonic transmitter to send the first ultrasonic signal, and controlling the second ultrasonic transmitter to send the first ultrasonic signal after a preset delay time.

10. The control method according to claim 7, further comprising:

controlling the first ultrasonic transmitter and the second ultrasonic transmitter according to the signals received by the plurality of ultrasonic receivers.

11. The control method according to claim 10, wherein controlling the first ultrasonic transmitter and the second ultrasonic transmitter according to the signals received by the plurality of ultrasonic receivers specifically comprises:

if it is determined that the front obstacle is on the left side of the home robot, controlling the second ultrasonic transmitter to send the second ultrasonic signal, wherein a signal strength of the second ultrasonic signal is less than that of the first ultrasonic signal; and if it is determined that the front obstacle is on the right side of the home robot, controlling the first ultrasonic transmitter to send the second ultrasonic signal.

12. The control method according to claim 11, further comprising:

if the front obstacle detected changes, adjusting the first ultrasonic transmitter or the second ultrasonic transmitter to send the first ultrasonic signal.

* * * * *